Oct. 29, 1957  A. R. COLLINS ET AL  2,811,166
MODULATING CONTROL DEVICE FOR GAS-FUELED HEATING SYSTEMS
Original Filed July 17, 1946  2 Sheets-Sheet 1

Inventors:
Arthur R. Collins
Frank A. Ryder
Ross D. Randall
By:
Hinkle, Horton, Ahlberg & Wupper
Attorneys

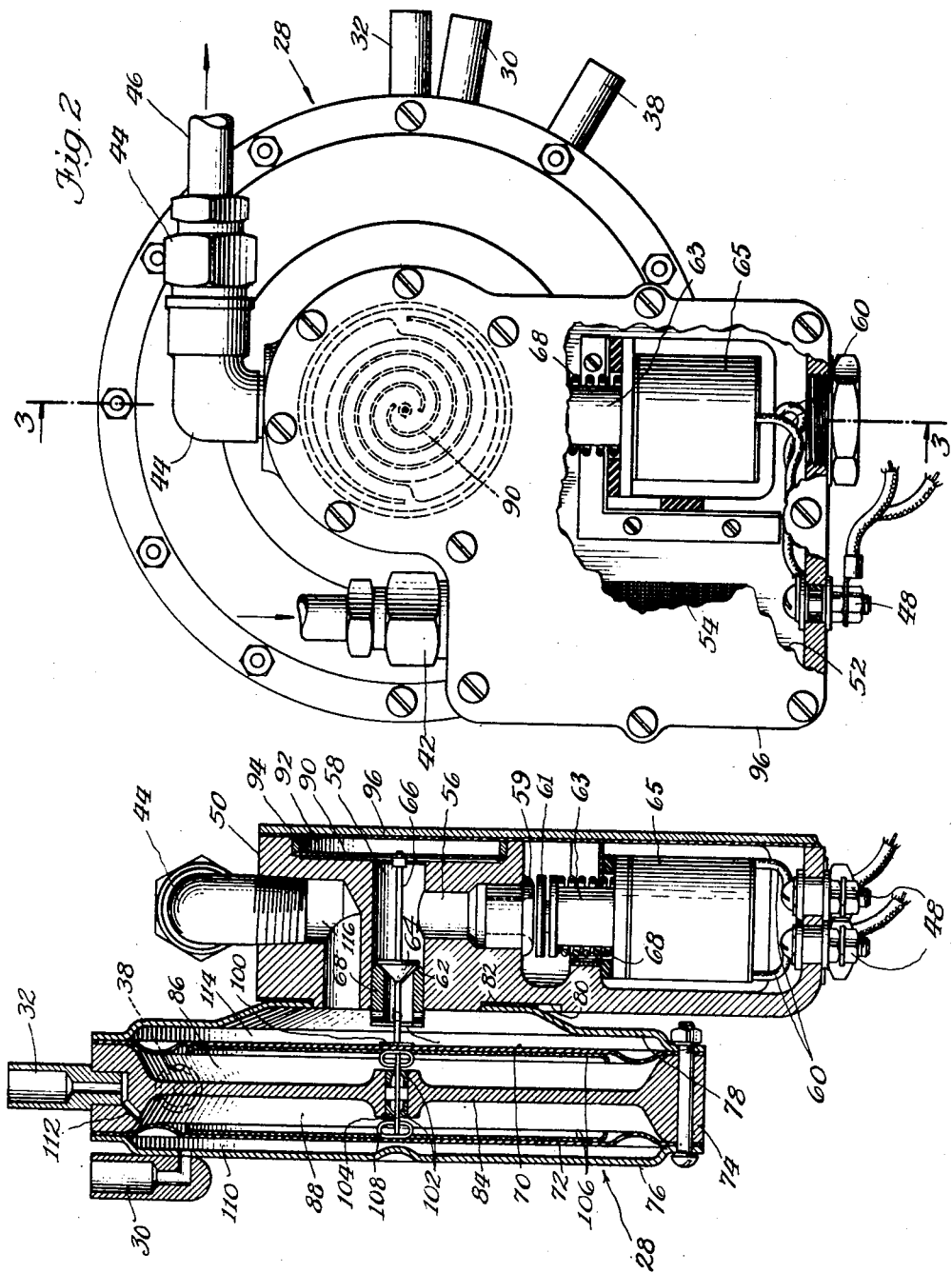

2,811,166

MODULATING CONTROL DEVICE FOR GAS-FUELED HEATING SYSTEMS

Arthur R. Collins, Indianapolis, Ind., and Frank A. Ryder, San Rafael, and Ross D. Randall, Burbank, Calif., assignors to Stewart-Warner Corporation, Chicago, Ill., a corporation of Virginia Original application July 17, 1946, Serial No. 684,350, now Patent No. 2,581,942, dated January 8, 1952. Divided and this application April 14, 1951, Serial No. 221,084

2 Claims. (Cl. 137—100)

The present invention relates to heater fuel modulating systems and is a division of our copending application Serial No. 684,350, filed July 17, 1946, for House Heaters, and issued into Patent No. 2,581,942, dated January 8, 1952. Ordinary house heaters or furnaces of the forced air circulating type normally cycle on and off according to demand, with the result that the temperature may fluctuate considerably and in addition the rate of air circulation is not held uniform and therefore the air within the space being heated has a different temperature gradient from floor to ceiling at different times, depending upon whether the air is circulating or not. The result attained by such a system, therefore, usually is such that when the furnace is operating the temperature in the space being heated is likely to seem too hot while when the furnace is not operating the temperature gradient becomes greater with the result that the room frequently seems too cold. It is one of the objects of the present invention to overcome this disadvantage generally associated with conventional hot air heating systems.

Another disadvantage present in ordinary hot air heating systems is that when the blower is operating it normally operates at full capacity and therefore is noisy. The present invention overcomes this advantage by modulating the heat output so that the amount of hot ventilating air supplied is always closely approximate to that needed to maintain the desired temperature, with the result that the ventilating air blower and the heating system generally very seldom operate at full capacity. The noise level therefore is quite low.

In general it may be said therefore that the heating system for which the present invention is intended is made up of a gas burner which heats and a heat exchanger in which heat is transferred to a ventilating air system. Both ventilating air and combustion air are supplied to the heater by means of blowers and the heat output and rate of circulation of ventilating air are both modulated so that the temperature of the ventilating air remains substantially constant although the amount of ventilating air and, therefore, the amount of heat supply varies according to the need as determined by a thermostat located within the space to be heated.

The modulating control of the present invention makes possible a reduction in the size of the heater as compared to the conventional "off-on" control and consequently makes possible a comparable reduction in the cost of manufacture.

Still another object is to provide a novel heater fuel modulating device in which the rate of gas supply to the burner is determined by the rate of combustion air supplied to the burner so that at all rates of combustion air supply the fuel air ratio will be constant.

Still another object is to provide a fuel modulating controller which will track the gas supplied to the burner along with the combustion air supply so that the burner can be modulated as to its heat output simply by controlling the rate of combustion air supply.

Other objects and advantages will become apparent from the following description of a preferred embodiment of our invention which is illustrated in the accompanying drawings, in which:

Fig. 2 is a front view of a controller forming a major portion of the operating mechanism with a portion of the case broken away so as better to reveal its structure; and Fig. 3 is a vertical sectional view taken in the direction of the arrows substantially along the line 3—3 of Fig. 2.

Figure 1:
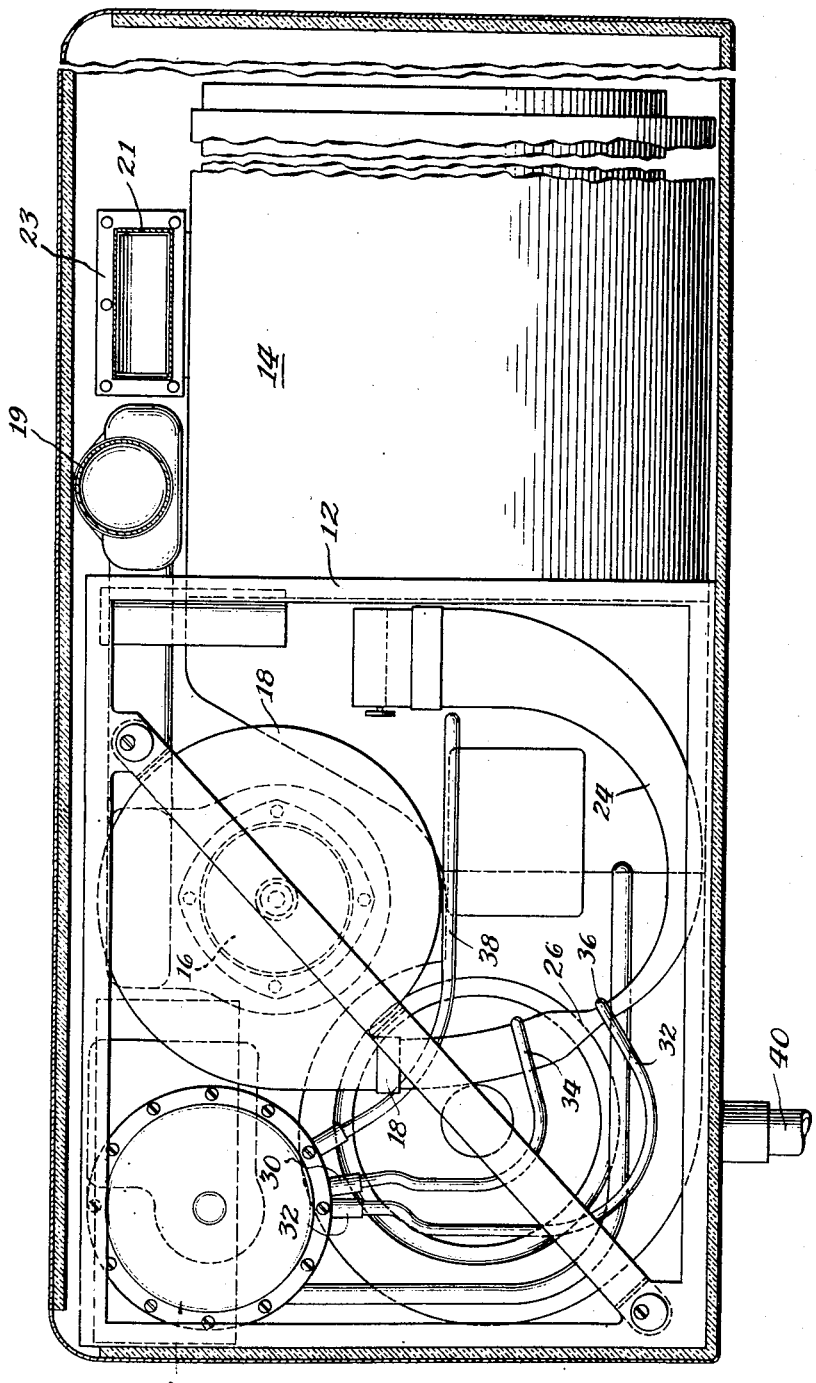
Fig. 1 is a side view of a heater mechanism according to the present invention, the case portion which would obscure the operating mechanism being cut away in longitudinal vertical section.

Referring to Figure 1, we have shown a heater of the type fully described in the before mentioned patent. For the present purpose it may be considered as comprised of a rectangular cabinet 10 with its interior divided by a vertical transverse partition 12. A burner, combustion chamber and heat exchanger 14 are located to the right of this portion as shown while most of the other operating mechanism is located to the left. Essentially it includes an electric motor 16 which drives a combustion air blower 18 directly and a ventilating air blower 20 by means of a belt not shown. Ventilating air passes to the heat exchanger by way of a shroud 22 and from the heat exchanger to the space to be heated. Combustion air is drawn into the blower 18 through a duct 19 and flows to the burner through a duct 24 having a constricted portion 26 to venturi form. From the heat exchanger the exhaust passes out outwardly through an elbow 21 and fitting 23. By simply varying the speed of the motor 16, the quantity of ventilating air and combustion air can be varied although they always remain in the same ratio to each other.

A fuel controller 28 has high and low control pressure connections 30 and 32 respectively which are connected in that order to a tap 34 located somewhat upstream of the venturi section 26 in the duct 24 and a tap 36 at the throat of the venturi 26. The pressure differential between these connections is therefore a function of the rate of combustion air flow through the duct 24 and hence to the burner. A third pressure connection 38 leads to a plenum chamber which encloses the inlet end of the burner and hence is sensitive to burner inlet pressure or in other words approximately atmospheric pressure. This controller 28 is connected by a pipe 40 to a source of fuel gas supply on its inlet side 42, while its outlet fitting 44 is connected to the burner by a tube 46. The purpose of this controller is to turn the fuel gas on and off through operation of any suitable electric circuit connected to its terminal 48 (a suitable circuit for this purpose is illustrated and described in the before mentioned patent application) and also to regulate the rate of fuel supply to the burner according to the rate of combustion air supply through the duct 24. By so doing, the heat output can be modulated as desired so as to be anything within the minimum and maximum capabilities of the heater while at the same time insuring that the ratio of combustion air to fuel will be constant and, therefore, that combustion will be stable and efficient.

The controller 28, shown in detail in Figs. 2 and 3, includes a casting 50 provided at one side with a chamber 52 connected to an inlet fuel fitting 42.

In order to remove solid or gummy matter from the fuel, the fuel passes from the fitting 42 into a fine mesh screen filter 54 located within the chamber 52 and thence outwardly through the openings in the screen into the chamber 52 proper. From here the fuel gas passes through a port 56 into a valve chamber 58. So as to insure the fuel being turned off completely whenever heater operation is shut down, the port 56 is provided with a valve seat 59 and with a poppet valve 61 located in operative relationship therewith. This poppet valve has a soft seat and is connected to an armature 63 of a solenoid 65. Normally, the poppet valve 61 is urged into closed position by a coil spring 68 so as to close off communication between the chamber 52 and the valve chamber 58.

The two electrical leads 60 of the solenoid are brought out and secured to the insulating terminal posts 48 previously mentioned to which electrical connections may be made from the outside, these two terminal posts passing through the casting 50 where it forms the lower side wall of the chamber 52. Whenever the solenoid 65 is energized electrically, the armature 63 will be urged downwardly so as to move the poppet 61 away from the valve seat 59, thereby permitting fuel gas to flow from the fitting 42 to the valve chamber 58.

The valve chamber 58 comprises a drilled passage through the casting which intersects the port 56. One end of this passage 58 is provided with a valve seat 62 which cooperates with a cone type valve 64 mounted upon a valve stem 66. The valve seat 62 is formed in a bushing 68 passed into the passage 58. Just beyond the bushing 68 a pair of spaced flexible diaphragms 70 and 72 are clamped at their edges around an annular ring 74 by means of a sheet metal cover plate 76 and a similar plate 78 having an opening in the center thereof, the plate 78 being secured by means of screws, not shown, to the face of the casting 50 substantially concentrically with the valve stem 66. In order to insure a tight seal, the surface of the casting at the point of securement to the plate 78 is preferably counterbored as at 80 and a soft rubber gasket 82 is interposed between the two surfaces. The annular ring 74 is formed integrally with a centrally disposed partition 84 which divides the region between the diaphragms into separate spaces, the space adjacent the diaphragm 70 being indicated by the numeral 86 while the outermost space adjacent the diaphragm 72 is denoted by the numeral 88.

The valve stem on the inlet side is secured to the center of a thin flat spiral spring 90 which is formed by cutting a pair of spiral slots through a thin spring metal disk. The edge of the disk is secured in the bottom of a counterbored opening 92 by a ring 94 held in place by a cover plate 96. The spring applies slight pressure to the end of the valve stem 66 so as to urge the valve 64 toward closed position. This pressure, however, is very slight and the purpose of the spring primarily is to center the valve stem and to cause it to follow the diaphragms rather than to apply any considerable pressure thereto.

The opposite end portion of the valve stem passes through a guide 98 secured to the upper end of the bushing 68 and its end is in engagement with a button 100 secured to the lower surface of the diaphragm 72 so that downward movement of the diaphragm will move the valve 64 toward open position while the soft spring 90 causes the valve to follow the diaphragm when the diaphragm moves in the opposite direction.

At its center the partition 84 has a drilled opening extending therethrough into which is pressed a pair of guides 102 which provide a loose fit for a pin 104. This pin rests with its ends against each of the diaphragms 72 and 70 and holds the diaphragms in spaced relation since, as will be pointed out presently, the tendency of these diaphragms is to move toward each other. In order to prevent the diaphragms from sagging to one side, thereby upsetting the adjustment, the diaphragms at their centers are provided with backing plates 106, the centers of which are cut to form tabs which are rolled into flattened oval shape and are drilled in alignment with the pin 104. These tabs, indicated by the numeral 108, act to support the diaphragms from the pin 104 regardless of the position of the device.

The high pressure tap 30 communicates through the cover 76 with the space 110 between the cover and the diaphragm 72. The space 88 on the opposite side of this diaphragm communicates by way of a passage 112 formed in the edge portion of the annular ring 74 with the fitting 32, this fitting being connected, as has previously been mentioned, with the low pressure point of the combustion air venturi 36. The space 86 between the partition 84 and the other diaphragm 70 is connected by way of the fitting 38 to the plenum chamber at the burner. The remaining space, indicated by the numeral 114, on the opposite side of diaphragm 70 is of course sensitive to the pressure of the fuel on the outlet side of the valve 64. This chamber is connected by way of a passage 116 to the fitting 44 connected to the gas pipe 46 leading to the burner.

The fuel pressure regulator operates in the following manner. Whenever the electrical circuit to the terminals 48 is energized, the poppet valve 61 will be opened by the solenoid 65, thereby permitting gas to flow to the modulating valve 64. If, now, it is assumed that the combustion air blower is operating and that the pressure in chamber 88 is lower than it is in chamber 110 since combustion air flowing through the ductwork will cause a lower pressure at the venturi 36 than at the high pressure tap 34, it will be seen that the pressure differential will tend to cause the diaphragm 72 to move toward the right. As soon as it moves slightly, the valve 64 will be opened and gas will flow into the chamber 114 and thence to the burner by way of the passage 116. Inasmuch as the pressure in the chamber 86 is at the level of the burner, or, in other words, substantially at atmospheric, the pressure of the gas will build up until the difference in pressure between the gas and the combustion air at the burner, this pressure differential tending to move the diaphragm 70 toward the left, balances the forces acting on the diaphragm 72. The burner, therefore, continues to receive fuel at the rate established by this balance. If, now, the combustion air blower is increased in speed so as to increase the differential tending to move the diaphragm 72 toward the right so as to open the valve, it will be seen that immediately the gas pressure in the space 114 will rise until a new balance is found, after which the burner continues to operate at a higher output since it is receiving both more combustion air and more fuel. Thus, by the expedient of simply controlling the speed of rotation of the combustion air blower, the heat output can be fixed at any desired level within the range of operation of the heater and under all such conditions the fuel air ratio will remain substantially constant, thereby insuring efficient combustion.

In Figs. 1 and 2 it may be noticed that the three pressure taps 32, 30 and 38 are radially separated so as to facilitate making connections to these taps. In Fig. 3, one of these taps 30 has arbitrarily been moved into radial alignment with the tap 32 so as to be in the plane of the section for the purpose of illustration, since it is believed that by so doing the construction and mode of operation will be made more clear. The pressure tap 38, however, has been permitted to remain in its actual location since the passages in the annular ring 74 for making connection between this tap and the space 86 are the reverse complement of those shown for connecting the tap 32 with the space 88.

Although for purpose of illustration a particular heater has been shown, it will be appreciated that the essentials of this modulating system are the controller, the gas supply under pressure, a variable source of combustion air, a burner to be operated and the duct with the venturi or equivalent therein to conduct the combination air to the burner from the source and to actuate the controller.

Having described our invention in connection with one embodiment thereof, what we claim as new and useful and desire to secure by Letters Patent of the United States is:

1. In a fuel gas supply conduit through which fuel gas flows under pressure to be mixed for burning with combustion air flowing at variable rates through a duct having means providing a pair of pressure taps such that the pressure differential between the taps is a function of the rate of flow of air through the duct, a fuel gas control valve comprising a modulating valve including means forming a valve seat and a valve member, means providing connections to cause said modulating valve to control flow through the conduit, first and second parallel diaphragms for operating said modulating valve, means including a partition between said diaphragms and forming therewith a space at either side of said partition, means forming chambers around the outer sides of said diaphragms, means forming a connection to the space on the partition side of said first diaphragm to subject said space to substantially atmospheric pressure, means forming a connection to the chamber on the outer side of said first diaphragm to subject the last said chamber to the gas pressure at the outlet of said modulating valve, means forming a connection to the space on the partition side of said second diaphragm for connecting the last said space to the lower of the pressure taps, means forming a connection to the chamber on the outer side of said second diaphragm for subjecting the last said chamber to the pressure prevailing at the higher of the pressure taps, a full floating pin in axial alignment with both diaphragms and located therebetween, means on said diaphragms to engage said pin to prevent substantial transverse movement of said diaphragms with respect to said pin, guide means for said pin arranged to permit longitudinal movement thereof but to prevent lateral movement thereof, said guide means being located in said partition between said diaphragms, said valve member having a valve stem, guide means for said valve stem to support said stem for longitudinal movement so that one end thereof may be brought into engagement with the outer side of one of said diaphragms, and soft acting resilient means urging said valve stem into engagement with said last mentioned diaphragm so that said valve member will follow movement of said last mentioned diaphragm.

2. In a fuel gas supply conduit through which fuel gas flows under pressure to be mixed for burning with combustion air flowing at varying rates through a duct having means providing a pair of pressure taps such that the pressure differential between the taps is a function of the rate of flow of air through the duct, a fuel gas control valve comprising a modulating valve including means forming a valve seat and a valve member, means providing connections to cause said modulating valve to control flow through the conduit, first and second parallel diaphragms for operating said modulating valve, means including a partition between said diaphragms and forming therewith a space at either side of said partition, means forming chambers around the outer sides of said diaphragms, means for subjecting the space on the partition side of said first diaphragm to substantially atmospheric pressure, means forming a connection to the chamber on the outer side of said first diaphragm to subject the last said chamber to the gas pressure at the outlet of said modulating valve, means forming a connection to the space on the partition side of said second diaphragm for connecting the last said space to the lower of the pressure taps, means forming a connection to the chamber on the outer side of said second diaphragm for subjecting the last said chamber to the pressure prevailing at the higher of the pressure taps, a full floating pin in axial alignment with both diaphragms and located therebetween, means on said diaphragms to engage said pin to prevent substantial transverse movement of said diaphragms with respect to said pin, guide means for said pin arranged to permit longitudinal movement thereof but to prevent lateral movement thereof, said guide means being located in said partition between said diaphragms, said valve member having a valve stem, and guide means for said valve stem to support said stem for longitudinal movement so that one end thereof may be brought into contact with the outer side of the first of said diaphragms, said guide means including a soft acting resilient means adapted for urging said valve stem into engagement with the first said diaphragm so that said valve member will follow movement of the first said diaphragm.

References Cited in the file of this patent
UNITED STATES PATENTS

| | | |
|---|---|---|
| 1,174,003 | Gibson | Feb. 29, 1916 |
| 1,363,513 | Keith | Dec. 28, 1920 |
| 2,311,061 | Lutherer | Feb. 16, 1943 |
| 2,393,841 | Titcomb | Jan. 29, 1946 |
| 2,418,163 | Chase | Apr. 1, 1947 |
| 2,641,237 | Deschamps | June 9, 1953 |